Patented May 15, 1951

2,553,124

UNITED STATES PATENT OFFICE 2,553,124

VINYL PLASTIC SEALING CEMENT

John R. Williams, Rahway, and John F. Forte, Irvington, N. J.; said Forte assignor to John Williams Co. Inc., a corporation of New Jersey No Drawing. Application April 3, 1950, Serial No. 153,758

2 Claims. (Cl. 260—31.2)

This invention relates to a novel sealing composition or cement for effectively repairing mars, cuts, and holes in vinyl plastic products such as inflated balloons, bags, sheets, toys, and other products molded of thin vinyl plastic sheets.

The primary object of this invention is to provide a sealing cement for vinyl products which will effectively seal such holes and seams in inflatable products as have heretofore defied repair. It is well known in the art that inflatable products fabricated of vinyl plastics which are torn at the seams or have substantial holes therein cannot be effectively repaired with sealing cements presently on the market so that the manufacturer is compelled to replace the entire product. Despite the knowledge in the art that conventional adhesives are formed of a solvent and pulverized scrap vinyl resins, such adhesives cannot effect a leak-proof seal on injured seams, nor can they effectively retain a patch over a substantial hole for any length of time. After the conventional sealing compounds or adhesives set or harden, they become brittle particularly at the juncture of the adhesives with the vinyl plastic so that, in due course, the seam becomes porous at the seal and the patch separates from the main body of the vinyl plastic. Heretofore, attempts to effect a proper seal of seams and relatively large holes in inflatable vinyl plastic materials have failed.

It is, therefore, the primary object of the present invention to provide a sealing cement which will effectively repair seams and relatively large holes in vinyl plastic products in such a manner that a smooth instead of a roughened contour will result and brittleness will be prevented. The present composition will effect a seal in which no appreciable disintegration will take place during the curing or evaporation process, in which the repaired spot will not have been weakened and will not show up markedly when the repaired item is inflated. Nor will the inflated article harden or dry out to the point of losing most of its elasticity when the present sealing composition is employed.

The concept of the present invention resides in the solution of a resin corresponding to the plastic material of the product to be repaired in an effective solvent for the resin to which is added an organic material which, although it is not a solvent for the resin, will effectively soften the same. The softening agent is preferably an organic acid containing a very small amount of water, the organic acid being added to the solution of the pulverized resin in the solvent in a relatively small quantity. Extensive experimentation has indicated that the softening agent keeps the resin in a fluid viscous form during the evaporation of the solvent thereby allowing the formation of a smooth and non-brittle seal or patch.

Specifically, the present sealing cement or composition has been conceived for use with the vinyl plastic such as polyvinyl chloride, polyvinyl acetate, polyvinyl chloride-acetate, vinyl chloride-vinylidene chloride copolymers, polyvinyl alcohol and polyvinyl acetals as fully described in the publication "Modern Plastics Encyclopedia," 1947, Volume 1, pages 133–145. The composition comprises a mixture of one or more of the above vinyl plastics dissolved in cyclohexanone to which is added a small quantity of glacial acetic acid. Although there are many solvents for the vinyl plastics or resins, it has been found that cyclohexanone has exceptional properties with regard to evaporation rate, tackiness, and adaptability for application to inflatable vinyl plastic products. The acetic acid is the softening agent which softens but does not dissolve the vinyl resins in the composition, and glacial acetic acid is employed so that a minimum of water is incorporated in the sealing composition or cement.

The cyclohexanone is mixed with the pulverized vinyl resins in proportions of from equal parts by weight of both down to one part of the vinyl resins to ten parts of the cyclohexanone, depending upon the type and gauge of the plastic for which the cement is intended. The glacial acetic acid will be added in an amount ranging from one-half to two per cent of the total volume of the composition.

The present sealing cement is especially adapted for use where two surfaces of the vinyl plastic material are joined or welded end to end without lapping, or repaired with the aid of a patch of vinyl material. Since it is not the desire to dissolve to any degree the plastic surfaces to be repaired, the least solvent necessary to get a workable compound is desired, a heavy solution being better for repairing thin gauge vinyl products. Cyclohexanone is employed as the solvent inasmuch as it is not a fast acting solvent and will, therefore, not have a tendency to dissolve the plastic material being repaired before it evaporates and the cement is cured. It has been found that the present composition is effective in repairing seams and even cuts two or three inches long can be repaired without a patch or overlapping by simply drawing the severed edges closely together and applying a small amount of the cement along the cut. When the cement is cured, the repair is permanent, the surface is smooth, non-brittle, and elastic. The curing time to complete a repair with the present composition is approximately three hours.

Although a specific embodiment of the present invention has been disclosed hereinabove, it will be understood that minor variations may be made in the composition by those skilled in the art without departing from the spirit of the invention or the scope of the appended claims.

Having described the invention, what is claimed as new is:

1. A composition for sealing materials fabricated of vinyl plastics selected from the class consisting of polyvinyl chloride, polyvinyl acetate, polyvinyl chloride-acetate, vinyl chloride-vinylidene chloride copolymers, polyvinyl alcohol and polyvinyl acetals comprising cyclohexanone, acetic acid, and a vinyl plastic of the above class.

2. A composition for sealing materials fabricated of vinyl plastics selected from the class consisting of polyvinyl chloride, polyvinyl acetate, polyvinyl chloride-acetate, vinyl chloride-vinylidene chloride copolymers, polyvinyl alcohol and polyvinyl acetals comprising cyclohexanone, acetic acid, and a vinyl plastic of the above class, the ratios of the cyclohexanone to the vinyl plastic ranging from equal parts by weight to one part of the vinyl plastic in ten parts of the cyclohexanone, the acetic acid being glacial and being present in from one-half to two per cent of the total volume.

JOHN R. WILLIAMS.
JOHN F. FORTE.

REFERENCES CITED

The following references are of record in the file of this patent:

UNITED STATES PATENTS

| Number | Name | Date |
|---|---|---|
| 2,249,915 | Reinhardt et al. | July 22, 1941 |
| 2,414,399 | Sorg | Jan. 14, 1947 |